(12) United States Patent
Pyron

(10) Patent No.: US 7,484,711 B2
(45) Date of Patent: Feb. 3, 2009

(54) INSERT FOR AIDING IN WIRE PULLING THROUGH CONDUIT BODIES

(75) Inventor: Roger Pyron, Bartlett, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 274 days.

(21) Appl. No.: 11/081,999

(22) Filed: Mar. 16, 2005

(65) Prior Publication Data

US 2005/0253124 A1 Nov. 17, 2005

Related U.S. Application Data

(60) Provisional application No. 60/570,636, filed on May 13, 2004.

(51) Int. Cl.
*H01B 7/00* (2006.01)

(52) U.S. Cl. .................. 254/134.3 FT; 254/134.3 R

(58) Field of Classification Search ........ 254/134.3 FT, 254/134.3 R; 385/124; 439/456
See application file for complete search history.

(56) References Cited

U.S. PATENT DOCUMENTS

| | | | |
|---|---|---|---|
| 2,946,560 A | 7/1960 | Ferm | |
| 3,037,744 A | 6/1962 | Cooper | |
| 3,038,702 A | 6/1962 | Trunnell | |
| 4,132,665 A | 1/1979 | Nelson | |
| 4,541,615 A | 9/1985 | King, Jr. | |
| 4,801,118 A | 1/1989 | Wium | |
| 4,946,137 A | 8/1990 | Adamczek | |
| 4,951,923 A | 8/1990 | Couture | |
| 5,029,817 A | 7/1991 | Tamm | |
| 5,067,678 A * | 11/1991 | Henneberger et al. | 248/68.1 |
| 5,236,177 A | 8/1993 | Tamm | |
| 5,271,605 A | 12/1993 | Damron | |
| 5,503,369 A * | 4/1996 | Frost et al. | 254/134.3 FT |
| D401,907 S | 12/1998 | Gazerro | |
| D445,765 S | 7/2001 | Wojcik | |
| 6,271,476 B1 | 8/2001 | Bobowick et al. | |
| 6,300,560 B1 * | 10/2001 | Mankins | 174/21 R |
| 6,388,193 B2 | 5/2002 | Maynard et al. | |
| D463,377 S | 9/2002 | Canty | |
| 6,452,096 B1 | 9/2002 | Childers | |
| 6,586,680 B1 | 7/2003 | Nelson | |
| 6,625,373 B1 * | 9/2003 | Wentworth et al. | 385/134 |
| 6,838,615 B2 | 1/2005 | Pyron | |
| 2004/0150171 A1 * | 8/2004 | Bonds | 277/628 |
| 2005/0253124 A1 * | 11/2005 | Pyron | 254/134.3 FT |

* cited by examiner

*Primary Examiner*—Lee D Wilson
(74) *Attorney, Agent, or Firm*—Hoffmann & Baron, LLP

(57) ABSTRACT

A universal insert aids in wire pulling through a conduit body. The insert includes a first flange; a second flange shorter than the first flange; and a curvilinear portion connecting the first and second flanges. A lower surface of the curvilinear portion and a lower portion of the first flange together define a smooth transition surface. The universal insert may be used in conjunction with any conventional conduit body.

12 Claims, 6 Drawing Sheets

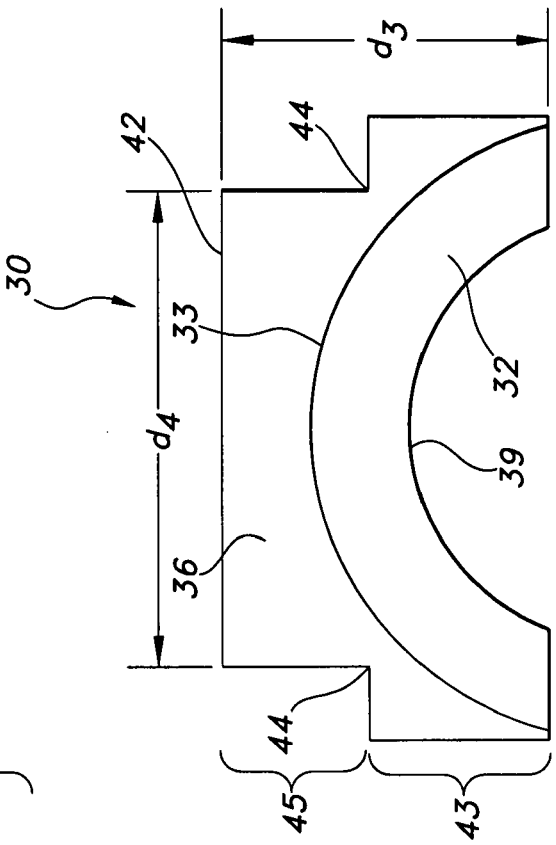
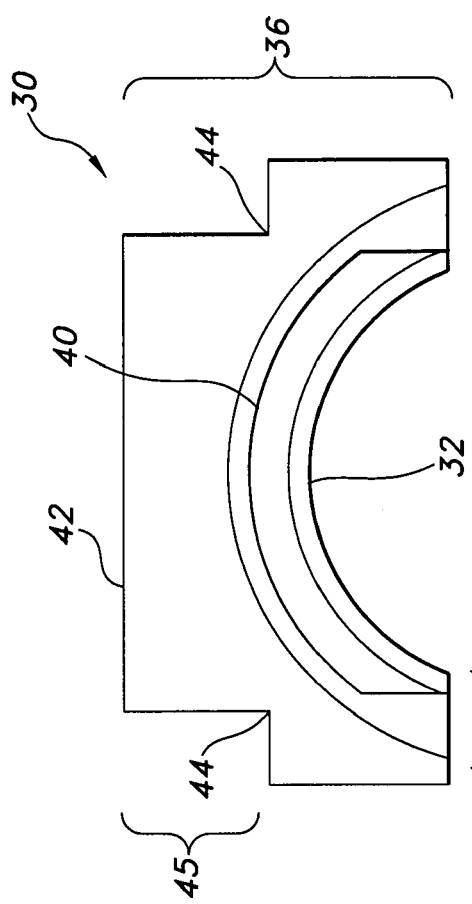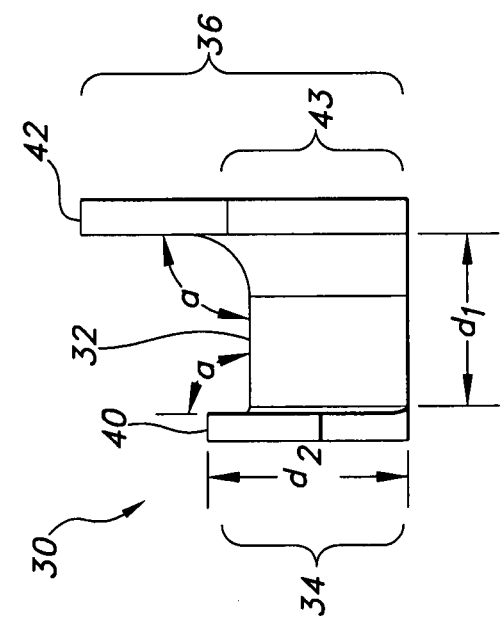

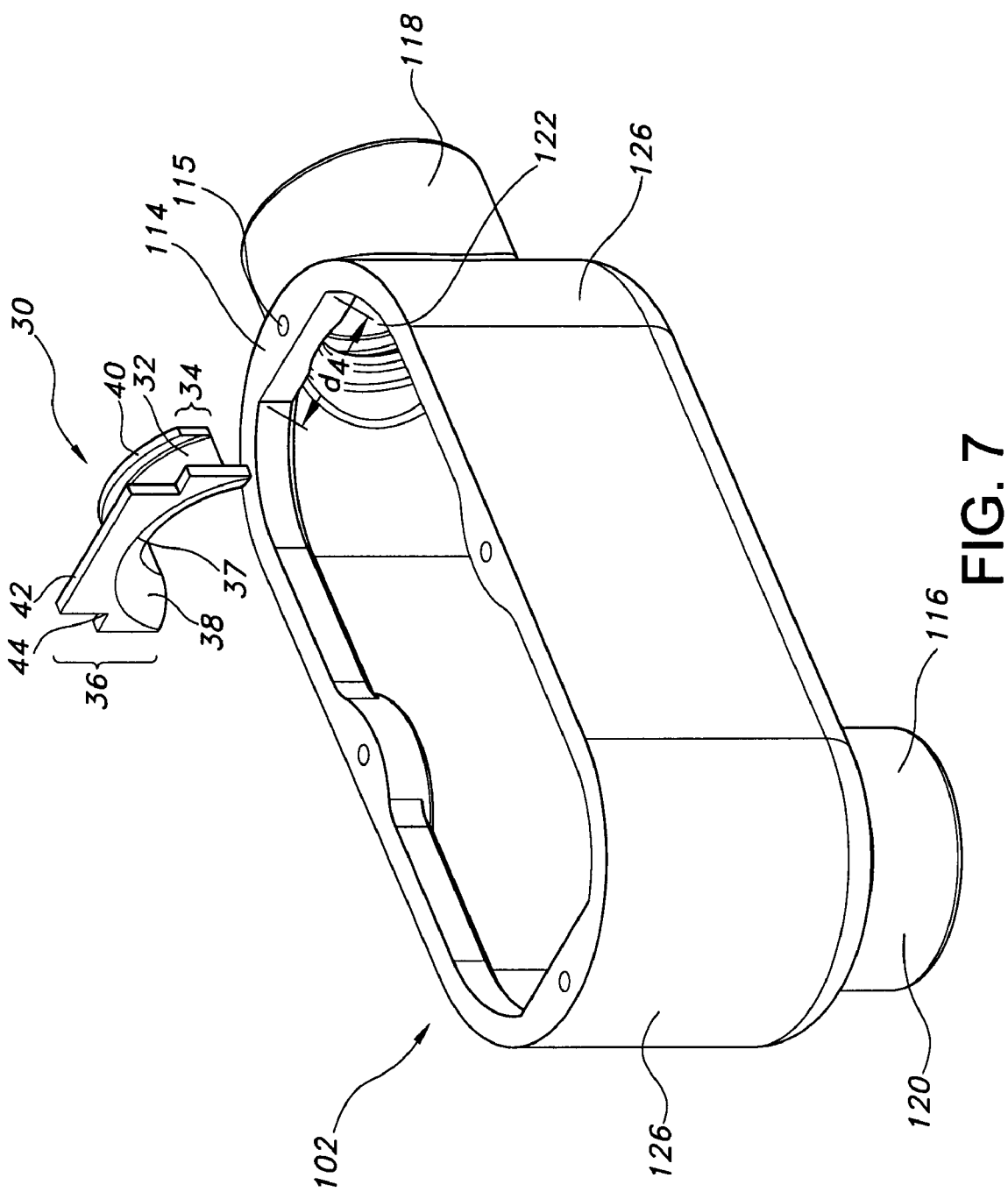

INSERT FOR AIDING IN WIRE PULLING THROUGH CONDUIT BODIES

CROSS-REFERENCE TO RELATED APPLICATIONS

The present application claims priority to Provisional Application No. 60/570,636, filed May 13, 2004, and entitled, "INSERT FOR AIDING IN WIRE PULLING THROUGH CONDUIT BODIES", herein incorporated by reference.

FIELD OF THE INVENTION

The present invention relates generally to an insert for aiding wire pulling through a conduit body containing electrical wires. More particular, the present invention relates to a universal insert for reducing friction associated with wires being pulled through a conduit body which may be used with any conventional conduit body.

BACKGROUND OF THE INVENTION

Electrical conduit systems are required in order to safely provide electric power to homes, commercial buildings, and the like. These conduit systems often include long runs of rigid electrical conduits or tubing systems with frequent changes in direction, such as 90° turns. The conduits include interruptions with various couplings to accommodate bends or changes in direction. The conduits serve to provide a protective housing for the wires therein and to route these wires throughout the building or other installation as required. Conduits are typically constructed of a rigid metal pipe.

A conduit body is a separate portion of a conduit or tubing system that provides easy access through a removable cover to the interior of a raceway or tubing system. Conduit bodies are used primarily as junction or pull boxes and are usually installed to facilitate a change in direction of wires in a conduit. Conventional conduit bodies can have openings at one or more ends as well as through the upper and lower walls. A conventional naming system identifies various types of conduit body configurations as "LB," "LR," "T," "X" and "C" which define the relative orientation of access ports and a removable cover.

Typically, wiring conduits involves first passing an electrical guide wire through a conduit body into an electrical conduit to another conduit body. In an exemplary wire pulling operation, insulated wires are secured to a hook end of the guide wire and are then pulled back through the conduit. Specifically, wires are inserted through an opening on the bottom or side of the conduit body and out through another opening located along another side or top of the conduit body. The friction caused by pulling the wires through the conduit causes friction between the wires and edges of the hub access port of the conduit body. This makes it difficult to pull the wire through the conduit housing, especially if there are many bends along the conduit length. While power pullers are used for this purpose it is not unusual for the insulation to be damaged or even for the pulled cords to break. Once broken in a conduit, a partially pulled wire is then very difficult to access. In addition, damage to the insulation caused by friction of the insulation rubbing against the edges of openings of the conduit body may go unnoticed.

Attempts to minimize such friction associated with the rubbing of wires against the openings of conduit bodies are known. For instance, some manufacturers have inserted roller pins and smooth shields to minimize the friction. However, such devices are usually expensive to construct having multi-part assemblies, and may not be used with conventional conduit bodies.

Accordingly, there is a present need for a device that allows for a reduction in friction associated with wires rubbing against the inside of the openings of a conduit body.

SUMMARY OF THE INVENTION

The present invention provides a universal insert for a conduit body, including: a first flange, a second flange shorter than said first flange, and a curvilinear portion connecting said first and second flange, wherein a lower surface of the curvilinear portion and a lower portion of the first flange together define a smooth transition surface.

Also provided is a universal insert for a conduit body, including: a first flange, a second flange shorter than the first flange, wherein the first and second flanges are substantially parallel, and a concave arched curvilinear portion connecting the first and second flanges, wherein a lower surface of the curvilinear portion and a lower portion of the first flange together define a rounded smooth transition surface.

With the foregoing and additional features in mind, this invention will now be described in more detail, and other benefits and advantages thereof will be apparent from the following detailed description when taken in conjunction with the accompanying drawings.

BRIEF DESCRIPTION OF THE DRAWINGS

FIG. 4 is a front plan view of a universal insert according to the invention.

FIG. 5 is a side plan view of a universal insert according to the invention.

FIG. 6 is a rear plan view of a universal insert according to the invention.

FIG. 7 is a top perspective view of a universal insert according to the invention arranged over a conduit body prior to assembly therewith.

DETAILED DESCRIPTION OF THE PREFERRED EMBODIMENTS

Figure 1:
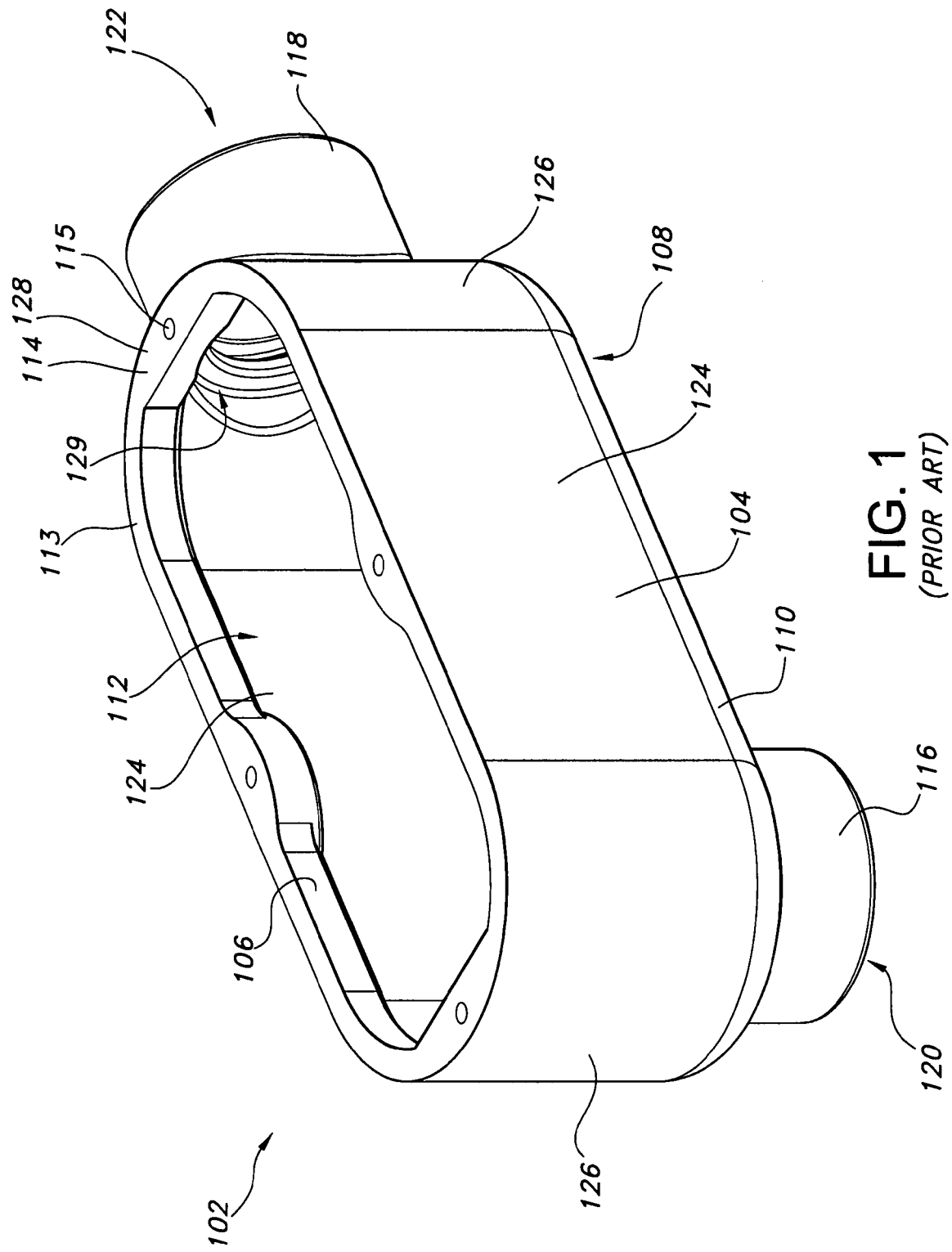
FIG. 1 is a perspective view of a conventional L-shaped conduit body.

Referring to the drawings in which like characters refer to like parts throughout the several views, FIG. 1 shows a conventional conduit body 102 including an upwardly extending sidewall 104 having an open upper end 106 and a closed lower end 108. The lower end 108 of sidewall 104 perimetrically bounds a lower wall 110 of the conduit body 102. Sidewall 104 includes two opposed parallel side portions 124 and two opposed curved end portions 126. Sidewall 104 and lower wall 110 together define a conduit body interior 112. The interior 112 may be enclosed by cover (not shown) over open upper end 106.

Sidewall 104 defines at the open upper end 106 a generally oval-shaped smooth planar rim 113. Planar rim 113 adjacent opposed curved end portions 126 defines an overlapping cutout portion 129. As shown in FIG. 1, opposed curved end portions 126 include a mounting boss 114 and a mounting hole 115 for attaching a cover (not shown), additional conduit bodies, adaptor modules or the like to conduit body 102.

Conduit body 102 further includes a pair of tubular projections or hubs 116, 118. Hub 118 extends outwardly from sidewall 104 of conduit body 102. Hub 116 extends outwardly from lower wall 110. The configuration shown is an L-shaped or elbow conduit body sometimes referred to as an LB conduit. Hubs 116 and 118 are in communication with conduit body interior 112 and serve as points of attachment for conduits (not shown). Each hub 116 and 118 ends in a circular opening or access port, 120 and 122, respectively. Access ports 120 and 122 have an inner diameter substantially equal to an outer diameter of an exterior of a conduit (not shown) so as to accommodate a conduit therein.

Figure 2:
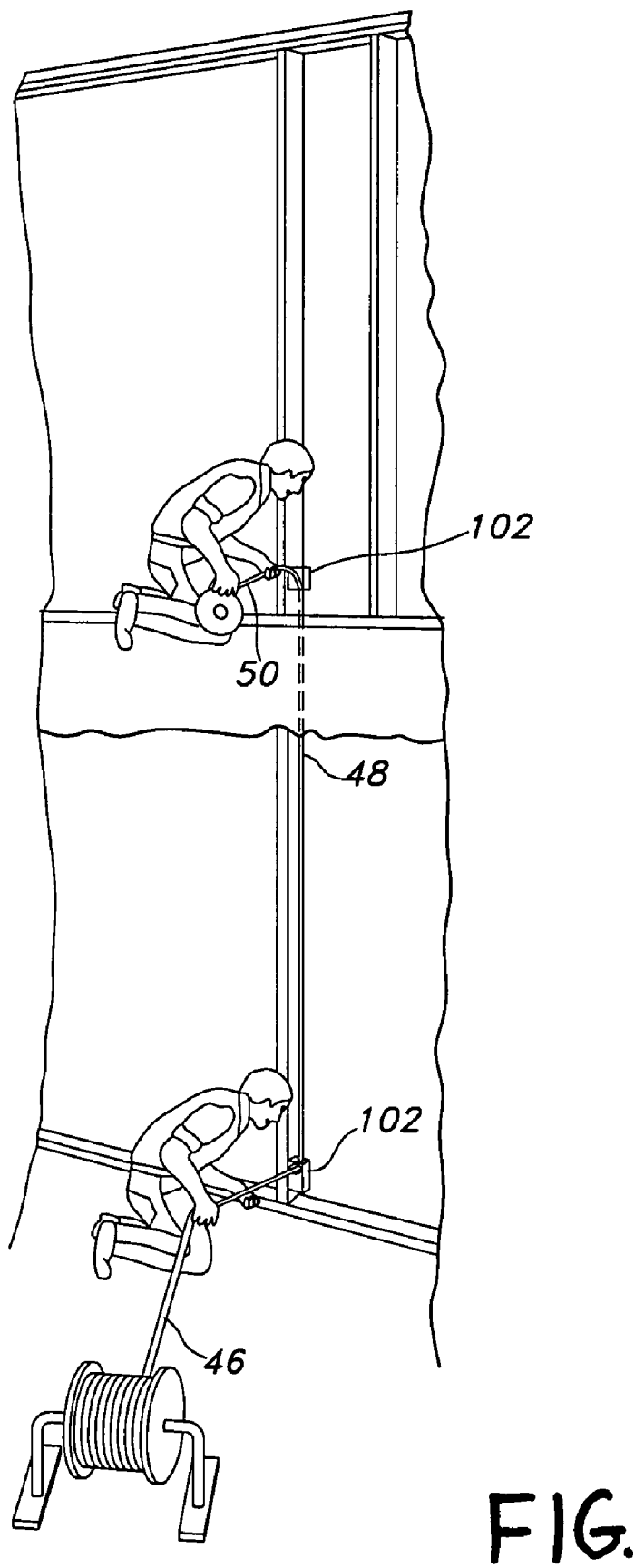
FIG. 2 is a perspective view of a wire pulling operation involving wire conduits attached to conduit bodies.
Figure 3:
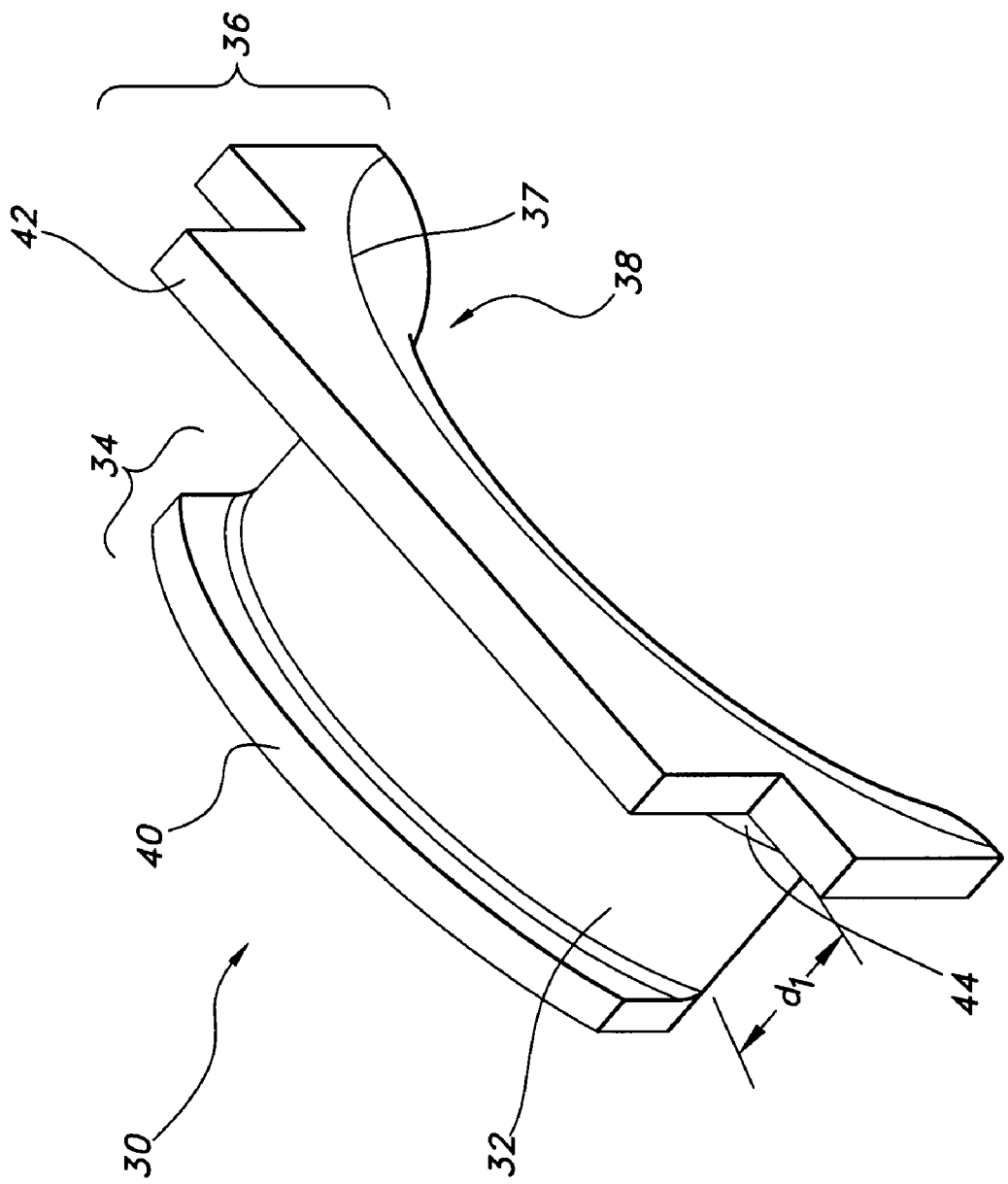
FIG. 3 is a top perspective view of a universal insert according to the invention.

Referring now to FIG. 2, a conventional wire pulling operation is shown. Wall mounted electrical conduit 48 from a first floor feeds to a second floor. Conduit 48 is attached to the conduit bodies 102 in any conventional manner, such as an adhesive, a bonding agent or a mechanical device, such as a male/female threading.

In the wire pulling operation shown in FIG. 2, a guide wire 50 is fed from the second floor to the first floor. The guide wire 50 is hooked onto insulated wire 46 on the first floor. Insulated wire 46 is then pulled to the second floor. The wire pulling operation puts stress on the insulated wire 46. Clearly, it would be advantageous if the insulated wire 46 were protected from abrasive contact with sharp edges in the interior of conventional conduit bodies.

The present invention provides a universal insert for use in conventional conduit bodies. The insert provides a smooth transition point for wires pulled through a conduit body via an access port. The insert may be inserted into and used with any conventional conduit body. The insert is removable and may be removed from the conduit body after a wire pulling operation. Alternatively, the insert may remain inside the conduit body after use.

The insert is designed so as to substantially conform to certain contours of a conventional conduit body. By so conforming, the insert may be securely seated in the conduit body by a snap-fit type placement therein. In use, pressure applied during a wire pulling operation in either direction will tend to assist in securement of the insert in the conduit body. However, even absent such applied pressure, the insert will remain securely seated in the conduit body due to its unique design features.

Referring now to FIGS. 3 to 6, a universal insert according to the invention is shown. Insert 30 includes a distal flange 34, a proximal flange 36 and a curvilinear portion or bridge 32 interposed therebetween. The curvilinear bridge 32 is arched so as to provide a smooth transition surface for passage of wires through the conduit body. Preferably, distal flange 34 is shorter than proximal flange 36. Distal flange 34 and proximal flange 36 include distal flange edge 40 and proximal flange edge 42, respectively.

A length of curvilinear bridge 32, identified as $d_1$, corresponds to the distance between an edge of rim 113 at curved end portion 126 and a cutout portion 129 of inner surface 127 of hub 118 of a conventional conduit body 102. Distal flange 34 is configured so as to engage cutout portion 129 in hub 118. Specifically, a height of distal flange 34, identified as $d_2$, is sufficient to engage cutout portion 129 of inner surface 127 of hub 118. This configuration allows for insert 30 to be securely seated within conduit body 102.

Additional design features further the goal of secure fitting of insert 30 in conduit body 102. Undercuts 44 are formed in proximal flange 36 so that an upper portion 45 of proximal flange 36 abuts an edge of rim 113 at curved end portion 126. A lower portion 43 of proximal flange 36 is wider than undercut 44 or upper portion 45. Accordingly, lower portion 43 of proximal flange 36 will engage the underside of rim 113.

Figure 8:
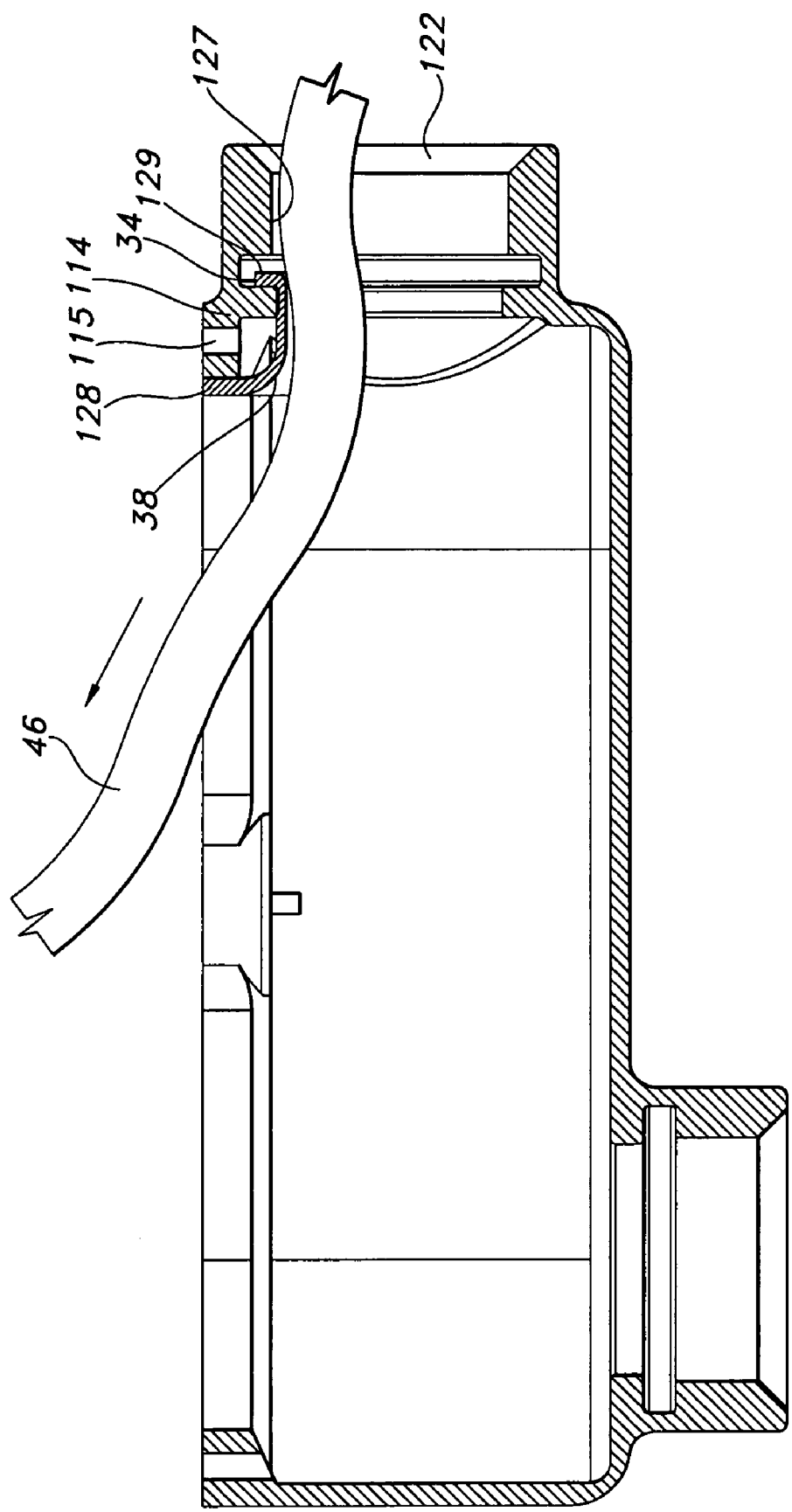
FIG. 8 is a cross sectional view of a universal insert according to the invention placed in a conduit body.

In a preferred embodiment of the invention, as best shown in FIG. 8, proximal flange 36 abuts mounting boss 114 portion of rim 113. In a particularly preferred embodiment, a length of a proximal flange edge 42, identified as $d_3$, is substantially the same as a length $d_4$ of mounting boss 114. Preferably, edge 42 at a top of proximal flange 36 is flush with upper rim 113 when insert 30 is placed in position in conduit body 102. In this embodiment, it is possible to leave insert 30 in place after a wire pulling operation as a cover (not shown) will fit over insert 30.

Flanges 34, 36 are generally parallel. However, in one embodiment of the invention, flanges 34, 36 are at an angle of slightly less than 90°. Accordingly, in this embodiment, an angle between flanges 34, 36 and a plane defined by curvilinear portion 32, identified as "a," is slightly less than 90° and assists in secure placement of insert 30 in conduit body 102.

Referring now to FIG. 7, a universal insert 30 according to the invention is shown arranged over a conventional conduit body 102 in position for proper placement therein. From this view, it is apparent that the insert 30 will provide a smooth transition surface 38 for wire being pulled through the conduit body 102 rather than a sharp angled surface of the interior of the conduit body 102 when used alone. More specifically, lower portion 43 of proximal flange 36 includes a rounded arch 37. Arch 37 connects proximal flange 36 with curvilinear portion 32 of insert 30 to define smooth transition surface 38. Preferably, arch 37 is concave with respect to interior 112 of conduit body 102.

In a preferred embodiment, an upper surface 33 of curvilinear portion 32 conforms in shape to an inner surface 127 of a hub 118 of a conventional conduit body 102. A lower surface 39 of curvilinear portion 32 is likewise rounded. Preferably, lower surface 39 is rounded so as to be concave with respect to interior of conduit body to accommodate a greater diameter of wire to be pulled through conduit body 102.

Referring now to FIG. 8, a cross sectional view of a conduit body 102 having a universal insert 30 of the invention placed therein is shown. An insulated wire 46 is shown in position for being pulled through conduit body 102. It is clear from this view that the universal insert 30 may remain in place after a pulling operation without interfering with the function of the conduit body. A cover (not shown) may be conveniently placed over the upper rim 113 without any interference from the insert 30. Alternatively, insert 30 may be manually removed from conduit body 30 before installation of a cover (not shown) and saved for reuse or discarded.

Referring again to FIG. 8, it can be seen that during a pulling operation, along the direction of the arrow, pressure on insert 30 against conduit body 102 will further secure conduit body 30 in position on conduit body 102. It should also be pointed out that wire 46 may also be pulled into conduit body 102 in a direction opposite to that shown by the arrow. Again, pressure on insert 30, and more particularly proximal flange 36 against end portion 128, will maintain insert 30 in place.

Insert 30 may be made using any suitable material. Preferably, insert 30 is a plastiform insulating material of unitary construction. Conventional cast molding, injection molding, co-injection or other techniques known to those having skill in the art may be used to form the insert. Desirable materials for insert 30 include, but are not limited to, nylon, polyethylene terephthalate (PET), polytetrafluoroethylene (PTFE), and the like. Preferably, the insert 30 is a self-lubricating material such as PTFE.

It will be apparent that the present invention has been described herein with reference to certain preferred or exemplary embodiments. The preferred or exemplary embodiments described herein may be modified, changed, added to, or deviated from without departing from the intent, spirit and scope of the present invention, and it is intended that all such additions, modifications, amendments and/or deviations be included within the scope of the following claims.

What is claimed is:

1. A universal insert for a conduit body, comprising:
   a first flange having a lower portion and an upper portion, said upper portion includes a pair of cutouts such that said lower portion is wider than said upper portion;
   a second flange shorter than said first flange;
   a curvilinear portion connecting said first and second flange, wherein said curvilinear portion includes a lower surface and an upper surface; and
   a smooth transition surface with a curved portion extending from said lower portion of said first flange and connecting to said lower surface of said curvilinear portion whereby said smooth transition surface curved portion is non planar and offset from said curvilinear portion.

2. The insert of claim 1, wherein said lower surface of said curvilinear portion is arched.

3. The insert of claim 1, wherein said lower surface of said curvilinear portion is rounded.

4. The insert of claim 1, wherein said lower portion of said first flange is arched.

5. The insert of claim 1, wherein said lower portion of said first flange is rounded.

6. The insert of claim 1, wherein said first flange and said second flange are generally parallel.

7. The insert of claim 1, wherein an angle between at least one of said first flange and said second flange with respect to a plane defined by said curvilinear portion, is about 90°.

8. The insert of claim 1, wherein an angle between at least one of said first flange and said second flange with respect to a plane defined by said curvilinear portion, is less than 90°.

9. The insert of claim 1, wherein said first flange further comprises opposed cutout portions.

10. The insert of claim 1, wherein a top edge of said first flange is flush with an upper rim of said conduit body when said insert is placed in said conduit body.

11. The insert of claim 1, wherein said insert is a plastiform of unitary construction.

12. A universal insert for a conduit body, comprising:
    a first flange having a lower portion and an upper portion, said upper portion includes a pair of cutouts such that said lower portion is wider than said upper portion;
    a second flange shorter than said first flange, wherein said first and second flanges are substantially parallel; and
    a concave arched curvilinear portion connecting said first and second flanges and a smooth transition surface is concaved surface connecting a lower surface of said curvilinear portion to a lower portion of said first flange whereby said smooth transition surface curved portion is non planar and offset from said curvilinear portion.

* * * * *